United States Patent
Stroom et al.

(10) Patent No.: US 6,245,301 B1
(45) Date of Patent: Jun. 12, 2001

(54) CATALYTIC CONVERTER AND DIESEL PARTICULATE FILTER

(75) Inventors: Paul D. Stroom, Minneapolis; Gary F. Howorth, St. Paul; Michael T. Schweitzer, Plymouth, all of MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 08/109,646

(22) Filed: Aug. 20, 1993

(51) Int. Cl.⁷ .................................................. F01N 3/28
(52) U.S. Cl. .................. 422/179; 422/180; 422/221; 422/222; 428/920
(58) Field of Search ........................... 422/177, 179, 422/180, 221, 222; 502/527; 60/299, 311, 322; 428/324, 325, 331, 428, 454, 920; 55/495, 500, 502, DIG. 30

(56) References Cited

U.S. PATENT DOCUMENTS

| | | | |
|---|---|---|---|
| Re. 27,747 | 9/1973 | Johnson | 165/166 |
| 3,441,381 | 4/1969 | Keith et al. | 422/176 |
| 3,795,524 | 3/1974 | Sowman | 501/95 |
| 3,854,888 | 12/1974 | Frietzsche et al. | 422/171 |
| 3,916,057 | 10/1975 | Hatch et al. | 428/236 |
| 3,948,611 | 4/1976 | Stawsky | 422/179 |
| 4,047,965 | 9/1977 | Karst et al. | 501/95 |
| 4,064,359 * | 12/1977 | Peterson et al. | 428/920 X |
| 4,142,864 * | 3/1979 | Rosynsky et al. | 422/179 |
| 4,143,117 * | 3/1979 | Gaysert | 422/179 |
| 4,156,533 | 5/1979 | Close et al. | 277/229 |
| 4,163,041 * | 7/1979 | Gaysert | 422/179 |
| 4,305,992 | 12/1981 | Langer et al. | 428/324 |
| 4,328,187 | 5/1982 | Musall et al. | 422/179 |
| 4,396,664 | 8/1983 | Mochida et al. | 428/116 |
| 4,556,543 | 12/1985 | Mochida et al. | 422/171 |
| 4,683,010 | 7/1987 | Hartmann | 148/287 |
| 4,693,338 | 9/1987 | Clerc | 181/231 |
| 4,899,540 | 2/1990 | Wagner et al. | 60/274 |
| 4,929,429 | 5/1990 | Merry | 422/179 |
| 4,999,168 | 3/1991 | Ten Eyck | 422/179 |
| 5,008,086 | 4/1991 | Merry | 422/180 |
| 5,045,385 * | 9/1991 | Luckanuck | 428/331 X |
| 5,207,989 | 5/1993 | MacNeil | 422/179 |
| 5,332,609 | 7/1994 | Corn | 428/77 |

FOREIGN PATENT DOCUMENTS

| | | |
|---|---|---|
| 343 2283A1 | 3/1986 | (DE) . |
| 35 14 150 C1 | 4/1986 | (DE) . |
| 370 0070A1 | 7/1988 | (DE) . |
| 38 20 981 C2 | 6/1991 | (DE) . |
| 1417718 | 12/1975 | (GB) . |
| 1457931 | 12/1976 | (GB) . |
| 1476183 | 6/1977 | (GB) . |
| 1568303 | 5/1980 | (GB) . |

OTHER PUBLICATIONS

Building Materials Directory, Underwriters Laboratories Inc., ISBN–1–55989–160–2, Copyright 1991, 2 pages.

3M Brochure entitled Interam™ 1–10 Serier Mat, Intumescent Ceramic Fiber Blanket, Document No. 98–0400–0585–6(96.5)R1, Double sided borchure, published before Aug. 20, 1992.

Fiberfrax™ Caulk Product Specifications Sheet, The Carborundum Company, 1985.

CEEPREE® "The Unique Fire Barrier Additive" Brochure, Brunner Mond & Company, Cheshire, England.

ACS Industries, Inc., of Woodsocket, RI, Press Release Sheet, Mar. 1, 1993.

(List continued on next page.)

*Primary Examiner*—Hien Tran
(74) *Attorney, Agent, or Firm*—Gregory D. Allen (57) ABSTRACT

Catalytic converter or diesel particulate filter or trap having edge protectant which reduces erosion of a lateral edge of an intumescent mounting mat when exposed to hot, impinging gases.

26 Claims, 2 Drawing Sheets

OTHER PUBLICATIONS

"Flow Effects in Monolithic Honeycomb Automotive Catalytic Converters," SAE 740244, Howitt et al., Automotive Engineering Congress, Detroit, MI, Feb. 25–Mar. 1, 1974, pp. 1–9.

"Thin Wall Ceramics as Monolithic Catalyst Supports," SAE 800082, Howitt, Congress and Exposition, Detroit, MI, Feb. 25–29, 1980, pp. 1–9.

"Cellular Ceramic Diesel Particulate Filter," SAE 810114, Howitt et al., International Congress and Exposition, Detroit, MI, Feb. 23–27, 1981, pp. 1–9.

"Systems Approach to Packaging Design for Automotive Catalytic Converters," SAE 900500, Stroom et al., International Congress and Exposition, Detroit, MI, Feb. 26–Mar. 2, 1990, pp. 39–50.

* cited by examiner

CATALYTIC CONVERTER AND DIESEL PARTICULATE FILTER

FIELD OF THE INVENTION

This invention relates to catalytic converters and diesel particulate filters or traps.

DESCRIPTION OF THE RELATED ART

High temperature intumescent mounting mats are commonly used to hold monoliths (e.g., catalytic converter elements or diesel particulate filters) in place while resisting erosion of gases at moderate pressure pulsations and temperatures (typically less than about 750° C.). For example, intumescent mounting mats do an adequate job of holding a ceramic monolith or diesel particulate filter in place with exhaust temperatures of less than about 750° C. and with moderate pressure pulsations of exhaust gases such as are commonly encountered with six or eight cylinder engines. However, in high performance automobiles and heavy duty trucks, the intumescent mounting mat is typically subjected to higher temperatures and more severe pressure pulsations. Under these more severe conditions, over a period of time, the intumescent material making up the mat if left unprotected can be eroded.

Solutions to the problem include the use of a stainless steel wire screen (see e.g., U.S. Pat. No. 5,008,086 (Merry)) and braided or rope-like ceramic (i.e., glass, crystalline ceramic, or glass-ceramic) fiber braiding or metal wire material (see, e.g., U.S. Pat. No. 4,156,33 (Close et al.)) to protect the edge of the intumescent mat from erosion by exhaust gases.

SUMMARY OF THE INVENTION

The present invention provides a catalytic converter (or diesel particulate filter) comprising a metallic casing, a catalytic converter element (or diesel particulate filter element) disposed within the metallic casing, and a mounting mat disposed between the catalytic converter element (or diesel particulate filter element) and the metallic casing for positioning the catalytic converter element (or diesel particulate filter element) within the metallic casing and for absorbing mechanical vibration (i.e., at least partially damping mechanical vibrations), the mounting mat comprising:

(a) an intumescent mounting mat having first and second opposed major surfaces, a leading edge, and a trailing edge; and (b) an edge protectant material covering at least a portion of at least one of the leading or the trailing edges (i.e., the leading edge or the trailing edge) to reduce erosion of at least one of the leading or the trailing edges when exposed to hot, impinging gases (i.e., above about 300° C., preferably above about 350° C., more preferably above about 500° C., and even more preferably above about 750° C.), the edge protectant material comprising binder material in the range from about 5 to about 85 percent by weight and dispersed (uniformly or nonuniformly) therein glass particles in the range from about 95 to about 15 percent by weight, based on the total weight of the binder material and the glass particles, wherein the glass particles are made of a glass having a softening point of at least about 350° C., and wherein the combined weight of the binder material and the glass particles is at least 20 percent by weight (preferably, at least about 35 percent by weight, more preferably, at least about 50 percent by weight, and, most preferably, at least about 75 percent by weight) of the total weight of the edge protectant material.

In another aspect, a catalytic converter (or diesel particulate filter) comprising a metallic casing, a catalytic converter element (or diesel particulate filter element) disposed within the metallic casing, and a mounting mat disposed between the catalytic converter element (or diesel particulate filter element) and the metallic casing for positioning the catalytic converter element (or diesel particulate filter element) within the metallic casing and for absorbing mechanical vibration, the mounting mat comprising the heated product of:

(a) an intumescent mounting mat having two opposed major surfaces, a leading edge, and a trailing edge; and (b) the edge protectant material covering at least a portion of at least one of the leading or the trailing edges to reduce erosion of at least one of the leading or the trailing edges when exposed to hot, impinging gases.

In another aspect, the present invention provides a catalytic converter (or diesel particulate filter) comprising:

(a) a metallic casing;

(b) a catalytic converter element (or diesel particulate filter element) disposed within the metallic casing;

(c) an intumescent mounting mat having two opposed major surfaces, a leading edge, and a trailing edge disposed between the catalytic converter element (or diesel particulate filter element) and the metallic casing for positioning the catalytic converter element (or diesel particulate filter element) within the metallic casing and for absorbing mechanical vibration; and (d) the edge protectant material disposed between the metallic casing and the catalytic converter element (or diesel particulate filter element) and positioned with respect to at least one of the leading or the trailing edges of the mounting mat such that erosion of at least a portion of at least one of the leading or the trailing edges is reduced when exposed to hot, impinging gases.

In yet another aspect, the present invention provides a catalytic converter (or diesel particulate filter) comprising:

(a) a metallic casing;

(b) a catalytic converter element (or diesel particulate filter element) disposed within the metallic casing; and (c) the heated product of:

(i) an intumescent mounting mat having two opposed major surfaces, a leading edge, and a trailing edge disposed between the catalytic converter element (or diesel particulate filter element) and the metallic casing for positioning the catalytic converter element (or diesel particulate filter element) within the metallic casing and for absorbing mechanical vibration; and (ii) the edge protectant material disposed between the metallic casing and the catalytic converter element (or diesel particulate filter element), and positioned with respect to at least one of the leading or the trailing edges of the mounting mat such that erosion of at least a portion of at least one of the leading or the trailing edges is reduced when exposed to hot, impinging gases.

In embodiments according to the present invention, the glass particles are capable of forming and are arranged to form a cohesive mass during the use of the catalytic converter or diesel particulate filter, the cohesive mass being capable of forming at a temperature not greater than 950° C. (see, e.g., Example 1).

In this application:

"leading edge" is the surface on one end of the mounting mat or the intumescent sheet material that extends between its first and second opposed major surfaces, and which is at the gas inlet side of the catalytic converter element (or the diesel particulate filter element);

"trailing edge" is the surface which is opposite to the leading edge, which extends between the first and second (opposed) major surfaces of the mounting mat or the intumescent sheet material, and which is at the gas outlet side of the catalytic converter element (or the diesel particulate filter element);

"binder material" refers to polymeric and other organic components of the edge protectant material that impart flexibility and hold the glass particles together;

"resilient" refers to the ability of a sheet or mat to conform to a curved surface (i.e., to wrap around a curved surface) without undesirable buckling or cracking of the sheet or mat;

"to reduce erosion of the lateral edge when exposed to hot, impinging gases" refers to the reduction in erosion of at least one of the leading or the trailing edges of the mounting mat by hot, impinging gases due to the presence of the edge protectant material;

"conformable" refers to the ability of the edge protectant material to accommodate dimensional changes during heating to, cooling from, and at use temperatures;

"glass frit" refers to glass (e.g., silicate glass) that has been melted and quenched (e.g., in water or air) to form small, friable glass particles;

"glass" as used herein refers to an amorphous (i.e., a material having a diffuse x-ray diffraction pattern without definite lines to indicate the presence of a crystalline phase) inorganic oxide material;

"softening point" refers to the temperature at which a glass in the form of a fiber of uniform diameter elongates at a specific rate under its own weight; and "heated product" refers to a mounting mat according to the present invention wherein at least about 50% (preferably, at least about 75%, most preferably, at least about 100%) by weight of the heat fugitive material (e.g., organic material and water, and/or solvent) present in the mounting mat has been removed by heating.

The use of the edge protectant material provides a solution to the problem of erosion of at least one of the leading or the trailing edges of an intumescent mounting mat when in use in an environment with an impinging gases above about 350° C.

DETAILED DESCRIPTION OF THE PREFERRED EMBODIMENTS

Figures 1, 2:
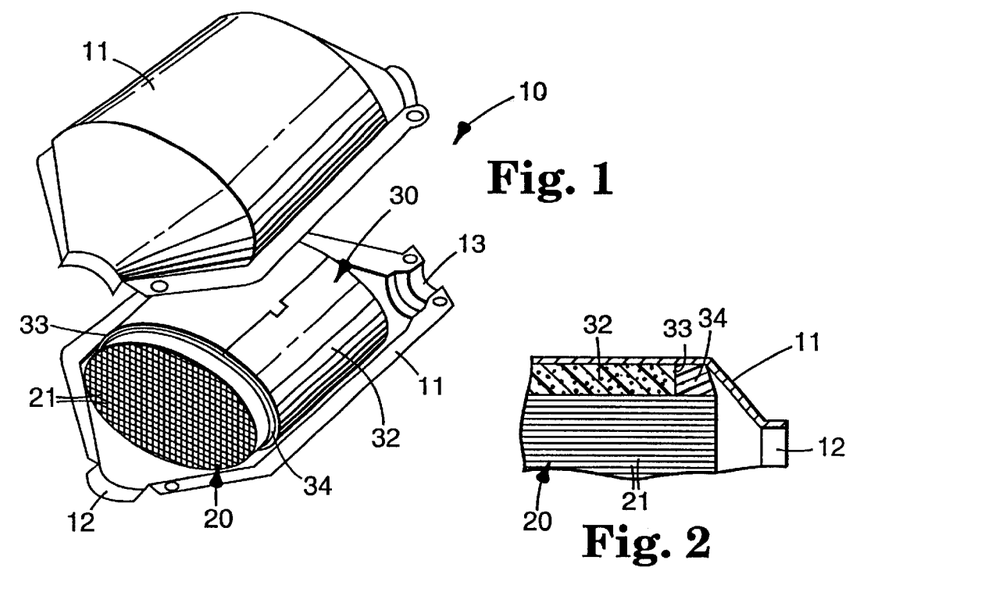
FIG. 1 is a perspective view of a catalytic converter (or diesel particulate filter) according to the present invention shown in disassembled relation.
FIG. 2 is a partial cut away view of a catalytic converter (or diesel particulate filter) according to the present invention.

Referring to FIG. 1, catalytic converter (or diesel particulate filter) 10 comprises metallic casing 11 with generally frustoconical inlet and outlet ends 12 and 13, respectively. Disposed within casing 11 is a monolithic catalytic converter element (or diesel particulate filter element) 20 formed of a honeycomb ceramic or metal having a plurality of gas flow channels 21 therethrough. Surrounding catalytic converter element (or diesel particulate filter element) 20 is mounting mat 30 comprising intumescent sheet material 32 and edge protectant material 34. Mounting mat 30 serves to tightly but resiliently support catalytic converter element (or diesel filter particulate element) 20 within casing 11. Further, mounting mat 30 serves to seal the gap between catalytic converter element 20 and casing 11 and prevent exhaust gas from by-passing catalytic converter element 20. Edge protectant material 34 serves to protect edge 33 of intumescent sheet material 32 from erosion caused by the impingement of exhaust gases. The edge protectant material can be present at the inlet end, the outlet end, or both.

FIG. 2 is a partial cut away view of assembled catalytic converter (or diesel particulate filter) 10 wherein mounting mat 30 is wrapped around catalytic converter element (or diesel particulate filter element) 20 which are positioned inside metallic casing 11.

Figure 3:
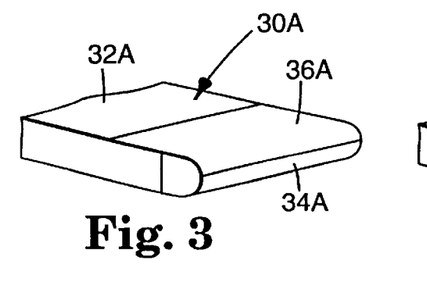
FIGS. 3, 4, and 5 are each partial views of mounting mats according to the present invention.
Figure 4:
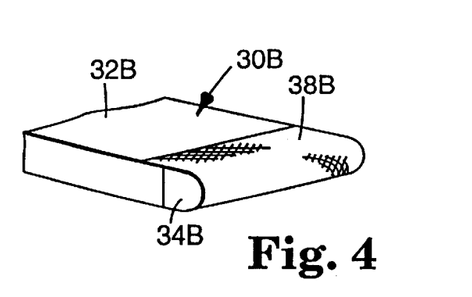
Figure 5:
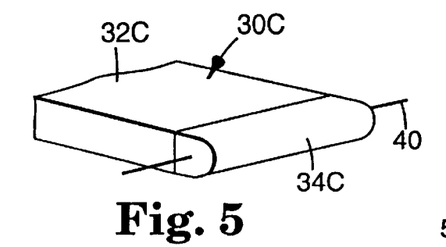

FIG. 3 shows a partial view mounting mat 30A wherein edge protectant material 34A is held to intumescent sheet material 32A by means of adhesive tape 36A. FIG. 4 shows a partial view of mounting mat 30B wherein wire screen 38B secures edge protectant material 34B to intumescent sheet material 32B. FIG. 5 shows a partial view of mounting mat 30C having intumescent sheet material 32C wherein edge protectant material 34C is reinforced with ceramic fiber (or metal wire) 40.

Figure 6:
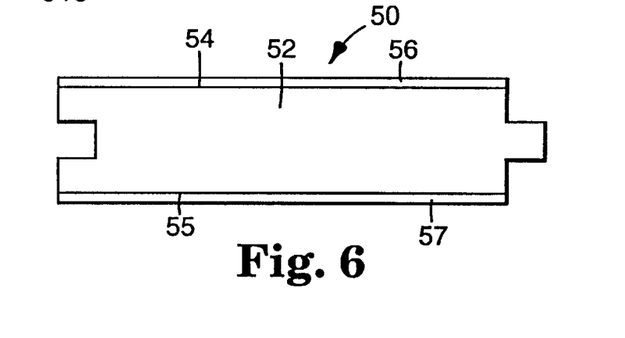
FIG. 6 shows an embodiment of a mounting mat.

FIG. 6 shows mounting mat 50 comprising intumescent sheet material 52 having edges 54 and 55 and edge protectant material 56 and 57, positioned next to edges 54 and 55, respectively.

Figure 7:
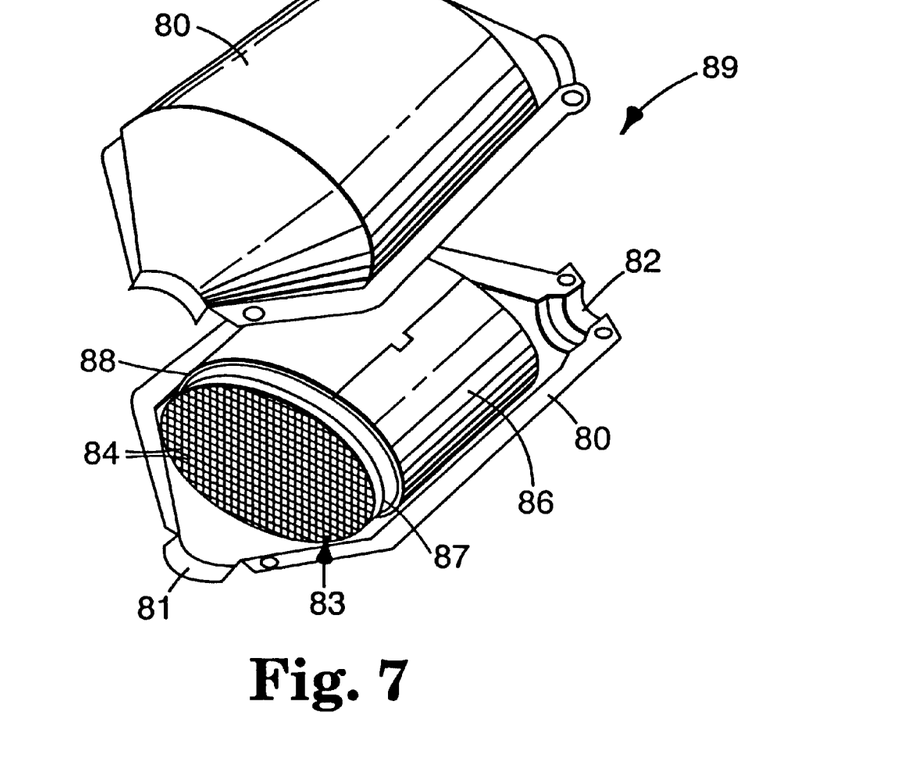
FIG. 7 is a perspective view of a catalytic converter (or diesel particulate filter) according to the present invention shown in disassembled relation.

Referring to FIG. 7, catalytic converter (or diesel particulate filter) 89 comprises metallic casing 80 with generally frustoconical inlet and outlet ends 81 and 82, respectively. Disposed within casing 80 is a monolithic catalytic converter element (or diesel particulate filter element) 83 formed of a honeycomb ceramic or metal having a plurality of gas flow channels 84 therethrough. Surrounding catalytic converter element (or diesel particulate filter element) 83 is intumescent mounting mat 86. Mounting mat 86 serves to tightly but resiliently support catalytic converter element (or diesel particulate filter element) 83 within casing 80. Edge protectant material 87, which optionally is positioned with respect to mat 86 to leave a gap, serves to protect edge 88 of mounting mat 86 from erosion caused by the impact of exhaust gases. Further, edge protectant material 87 may serve to minimize exhaust gas from bypassing the catalytic converter element (or diesel particulate filter element) 83. The edge protectant material can be present at the inlet end, the outlet end, or both.

Figure 8:
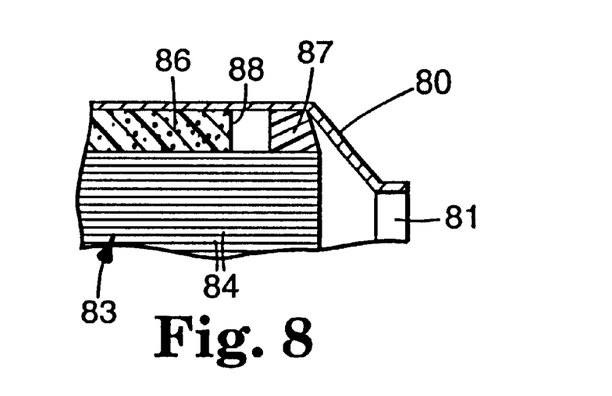
FIG. 8 is a partial cutaway view of a catalytic converter (or diesel particulate filter) according to the present invention.

FIG. 8 is a partial cutaway view of assembled catalytic converter (or diesel particulate filter) 89 wherein mounting mat 86 is wrapped around catalytic converter element (or diesel particulate filter element) 83 which is positioned inside metallic casing 80.

The metallic casing can be made from suitable materials known in the art for such use. Preferably, the casing is made of stainless steel.

Suitable catalytic converter elements are known in the art and include those made of metal or ceramic. A useful catalytic converter element is disclosed, for example, in U.S. Pat. No. RE 27,747 (Johnson), the disclosure of which is incorporated herein by reference for its teaching of catalytic converter elements.

Further, ceramic catalytic converter elements are commercially available, for example, from Corning Inc. of Corning, N.Y., and NGK Insulator Ltd. of Nagoya, Japan. For example, a honeycomb ceramic catalyst support is marketed under the trade designation "CELCOR" by Corning Inc. and "HONEYCERAM" by NGK Insulator Ltd. Metal catalytic converter elements are commercially available from Behr GmbH and Co. of Germany.

For additional details regarding catalytic monoliths see, for example, "Systems Approach to Packaging Design for Automotive Catalytic Converters," Stroom et al., Paper No. 900500, SAE Technical Paper Series, 1990; "Thin Wall Ceramics as Monolithic Catalyst Supports," Howitt, Paper 800082, SAE Technical Paper Series, 1980; and "Flow Effects in Monolithic Honeycomb Automotive Catalytic Converters," Howitt et al., Paper No. 740244, SAE Technical Paper Series, 1974, the disclosures of which are incorporated herein by reference for their teaching of catalytic converters.

The catalyst materials coated onto the catalytic converter elements include those known in the art (e.g., metals such as ruthenium, osmium, rhodium, iridium, nickel, palladium, and platinum, and metal oxides such as vanadium pentoxide and titanium dioxide). For further details regarding catalytic coatings see, for example, U.S. Pat. No. 3,441,381 (Keith et al.), the disclosure of which is incorporated herein by reference for its teaching of catalytic coatings.

Conventional monolithic type diesel particulate filter elements are typically wall flow filters comprised of honeycombed, porous, crystalline ceramic (e.g., cordierite) material. Alternate cells of the honeycombed structure are typically plugged such that exhaust gas enters in one cell and is forced through the porous wall of one cell and exits the structure through another cell. The size of the diesel particulate filter element depends on the particular application needs. Useful diesel particulate filter elements are commercially available, for example, from Corning Inc. of Corning, N.Y., and NGK Insulator Ltd. of Nagoya, Japan. Further, useful diesel particulate filter elements are discussed in "Cellular Ceramic Diesel Particulate Filter," Howitt et al., Paper No. 810114, SAE Technical Paper Series, 1981, the disclosure of which is incorporated herein by reference for its teaching of diesel particulate filter elements.

Suitable intumescent sheet material, which is typically resilient, is known in the art. Factors to consider in choosing an intumescent sheet material include the use temperature and the type of monolith (e.g., ceramic monolith or metallic monolith). Suitable intumescent sheet materials typically comprise unexpanded vermiculite ore (commercially available, for example, from W. R. Grace and Co. of Cambridge, Mass.), organic binder and/or inorganic binder, ceramic fibers, and filler (e.g., clay (e.g., kaolin) and hollow ceramic beads or bubbles). For example, U.S. Pat. No. 3,916,057 (Hatch et al.), the disclosure of which is incorporated herein by reference for its teaching of intumescent sheet material, discloses intumescent sheet material comprising unexpanded vermiculite, inorganic fibrous material, and inorganic binder. U.S. Pat. No. 4,305,992 (Langer et al.), the disclosure of which is incorporated herein by reference for its teaching of intumescent sheet material, discloses intumescent sheet material comprising ammonium ion-treated vermiculite, inorganic fibrous material, and organic binder. Further, intumescent sheet material is commercially available, for example, from the 3M Company of St. Paul, Minn., under the trade designation "INTERAM MAT MOUNT."

Suitable organic binders for the intumescent sheet material are known in the art and include polymers and elastomers in the latex form (e.g., natural rubber latices, styrene-butadiene latices, butadiene-acrylonitrile latices, and latices of acrylate and methacrylate polymers and copolymers). Suitable inorganic binders are known in the art for such use and include tetrasilisic fluorine mica, in either the water-swelling unexchanged form or after flocculation as the exchanged salt with a divalent or polyvalent cation, and bentonite.

The mounting mat can be cut to any desired size and shape. The size and shape of the high temperature mounting mat according to the present invention depends on the application requirements. For example, automobile catalytic converters typically are smaller than diesel converters and generally require a correspondingly smaller mounting mat. Mounting mats can be stacked so that more than one layer of mat is wrapped around a monolith. Typically, the thickness of each intumescent sheet is in the range from about 1.5 mm to about 10 mm.

In another aspect, the weight per unit area value of each intumescent sheet typically ranges from about 1000 g/m$^2$ to about 7000 g/m$^2$.

The edge protectant material preferably comprises binder material in the range from about 15 to about 85 (more preferably, about 25 to about 75, and most preferably, about 35 to about 45) percent by weight and dispersed therein glass particles in the range from about 85 to about 15 (more preferably, about 75 to about 25, and most preferably, about 60 to about 30) percent by weight, based on the total weight of the edge protectant material.

Suitable organic binder materials for the edge protectant material include aqueous polymer emulsions and solvent-based polymers, and 100% solids polymers. The solvent-based polymeric binders can include a polymer such as an acrylic, a polyurethane, or rubber-based organic polymer which allow flexibility. The 100% solids polymers include natural rubber, styrene-butadiene rubber, and other elastomers.

The binder material can include at least one of a tackifier (s), a plasticizer(s), or both. Tackifiers, or tackifying resins can be hydrocarbons or modified resin esters, and typically provide adhesive-type properties to a polymer. Tackifiers aid in holding the binder, glass, particles and filler together. Plasticizers tend to soften a polymer matrix and thereby contribute to the flexibility and moldability of the edge protectant material. It is desirable that the edge protectant material be flexible and moldable so that it can conform, for example, to the shape of the gap between, for example, a catalytic converter element and a metallic casing.

Preferably, the organic binder material includes an aqueous acrylic emulsion. Acrylic emulsions are preferred because of their aging properties and noncorrosive combustion products. Useful acrylic emulsions include those commercially available under the trade designations "RHOPLEX TR-934" (a 44.5% by weight solids aqueous acrylic emulsion) and "RHOPLEX HA-8" (a 44.5% by weight solids aqueous emulsion of acrylic copolymers) from Rohm and Haas of Philadelphia, Pa. A preferred acrylic emulsion is commercially available under the trade designation "NEOCRYL XA-2022" (a 60.5% solids aqueous dispersion of acrylic resin) from ICI Resins US of Wilmington, Mass.

A preferred organic binder material comprises acrylic resin in the range from about 20 to about 40 percent by weight, plasticizer(s) (e.g., such as that commercially available under the trade designation "SANTICIZER 148" (isodecyl diphenyl diphosphate) from Monsanto of St. Louis, Mo.) in the range from about 40 to about 20 percent by weight, tackifier(s) (e.g., rosin tackifier such as that commercially available under the trade designation "SNOWTACK 820A" (a 50% by weight aqueous rosin dispersion; melting point of rosin: 55° C.) from Eka Nobel, Inc., of Toronto, Canada) in the range from about 40 to about 20 percent by weight, based on the total weight of the resulting dispersion. These ranges provided a compromise between the desired flexibility of the binder material and minimizing the amount of organic binders which burn out during heating to the use temperature.

Suitable glass particle compositions will be apparent to those skilled in the art of formulating glass compositions. Such glasses may include those comprised of silicates of lithium, sodium, potassium, magnesium, calcium, and combinations thereof. Other metal oxides, such as boria and alumina, and oxides of transition metals (e.g., chromium, iron, cobalt, and zinc) commonly are used in glasses and may be present in the glass composition. The glass composition selected for a particular use is selected to be compatible at the use temperature with the materials in which the glass is in contact (e.g., the other components of the edge protectant material and, for example, in the case of a catalytic converter, the casing and the catalytic converter element).

Further, the glass composition chosen should not flow at the use temperature to the extent that such flow significantly affects the function of the edge protectant material to reduce the erosion of the edge of the mat. Most preferably, the glass at the use temperature softens and forms a cohesive mass. Further, the glass particles can be capable of forming and can be arranged to form a cohesive mass during the use of the catalytic converter or diesel particulate filter, wherein the cohesive mass can be capable of forming at a temperature not greater than 950° C.

Preferred silicate glass particles are commercially available from ICI Americas of Wilmington, Del., under the trade designation "CEEPREE FIRE BARRIER FILLER, GRADE C-200" (density: 2.68 g/cm$^3$; oil absorption: 20 g/100 g; specific surface area: 0.7 m$^2$/g; moisture content: <1%; Mohs hardness: 4; refractive indices: 1.52–1.58; and mean particle size: 30 micrometers).

The glass particles can be solid particles or beads, or hollow spheres. The size of the glass particles is dependent on the particular application requirements. Typically, the glass particles have an average particle size of less than about 300 micrometers. Glass particles less than about 300 micrometers in size typically are easier to disperse within the binder material.

The edge protectant material can further comprise additives such as fillers and extenders. Fillers and extenders may comprise up to about 65 weight percent of the edge protectant material. Preferably, these materials comprise no more than about 50 weight percent of the edge protectant material.

Suitable fillers include hydrated metal oxides (e.g., sodium silicate) and borates (e.g., boric acid and zinc borate). Preferably, the filler is relatively insoluble in water and chemically inert. The use of refractory materials such as bentonite or kaolin-type clays and vermiculite as the filler may increase the useful life and/or use temperature of the edge protectant material. Forms of vermiculite include unexpanded vermiculite (i.e., as the ore), expanded vermiculite (i.e., heat treated, also known as exfoliated), or delaminated vermiculite.

Although expanded vermiculite can provide workable edge protectant material compositions, delaminated vermiculite is preferred. Delaminated vermiculite has the appearance of a powder and can be prepared, for example, by ball-milling or high shear mixing of unexpanded or expanded vermiculite.

Fillers can be in a variety of shapes including particulate and chopped fibers. The fiber can be reduced in size by conventional techniques including dry or wet ball milling. Useful fibers include graphite, silica, alumina-silica, calcia-silica, asbestos, and glass fibers. Aluminosilicate fibers are commercially available, for example, under the trade designation "CERAFIBER" from Thermal Ceramics of Augusta, Ga.

Refractory materials such as clays may be used to increase the high temperature durability of the edge protectant material. Such refractory materials are preferably present up to 40 percent by weight, based on the total weight of the edge protectant material.

Extenders (e.g., silica sand) can be added to reduce the cost of the mixture without reducing its effectiveness.

Preferably, the binder material includes a tackifier(s) and plasticizer(s) which increases the conformability or moldability of the edge protectant material even after it has dried.

The edge protectant material can be prepared by mixing the binder material, glass particles, and any optional additives together. Optionally, water, dispersants, tackifiers, plasticizers, and/or surfactants can independently be added to aid in mixing the components together and/or to adjust the viscosity of the mixture. Mixing of the ingredients can be done by any convenient means including stirring by hand or using a mogul mixer. The resulting mixture, which is typically viscous, can then be formed into the desired shape. For example, the resulting mixture can be formed into a sheet, cut into strips, and then dried (e.g., in air) for several hours before application, for example, to an edge of the mounting mat. Alternatively, the viscous mass can be extruded into various shapes and attached or affixed to an edge of the mounting mat, or extruded into the desired shape and dried in air before application.

Suitable fibers for use as reinforcement fibers as shown, for example, in FIG. 5 or as chopped fibers dispersed within the edge protectant material include aluminosilicate fibers (available, for example, under the trade designations "NEXTEL 312 CERAMIC FIBERS," "NEXTEL 440 CERAMIC FIBERS," and "NEXTEL 550 CERAMIC FIBERS" from the 3M Company, "FIBERFRAX 7000M" from Carborundum Company of Niagara Falls, N.Y., "CERAFIBER" from Thermal Ceramics of Augusta, Ga., and stainless steel fibers (commercially available, for example, under the trade designation "BEKI-SHIELD GR90/C2/2" from Bekaert Steel Wire Corp. of Atlanta, Ga.). Suitable ceramic fibers are also disclosed in U.S. Pat. Nos. 3,795,524 (Sowman) and 4,047,965 (Karst et al.), the disclosures of which are incorporated herein by reference for their teachings of ceramic fibers.

The edge protectant material can be secured to the sheet material, for example, by means of a pressure sensitive adhesive tape or film or a metallic fabric (e.g., a stainless steel screen). A preferred metallic fabric is made of woven metal (preferably stainless steel) wire with an open area of less than 90%, wherein the wire has a diameter less than 1 mm (preferably about 0.20 mm). If additional means for securing the metal fabric are needed, such means can include tape, adhesive, and mechanical means such as sewing, stapling, nailing, riveting, staking, or crimping. Preferably, the edge of the metal fabric extends up to about 8 mm beyond the lengthwise edge of the mounting mat. Although typically preferred, it is not necessary that the entire length of the mat be covered by the metal fabric.

Alternatively, in some embodiments, the edge protectant material may be placed at the edge of the mat without reinforcement or fastening.

The edge protectant material may also be useful in the construction of insulated end-cones of catalytic converters and insulated double-walled exhaust pipes.

Objects and advantages of this invention are further illustrated by the following examples, but the particular materials and amounts thereof recited in these examples, as well as other conditions and details, should not be construed to unduly limit this invention. All parts and percentages are by weight unless stated otherwise.

EXAMPLES 1–44

The formulations of Examples 1–44, which are useful as the edge protectant material are given in Table 1, below.

TABLE 1

| Example No. | Binder, % | Clay, % | Ceramic fiber, % | Glass particles, % | Boric acid, % | Hydrated sodium silicate, % | Sodium silicate cement, % | Expanded vermiculite, % | Zinc borate, % | Delaminated vermiculite, % | Ball milled ceramic fiber, % |
|---|---|---|---|---|---|---|---|---|---|---|---|
| 1 | 35 | 9 | 7 | 49 | | | | | | | |
| 2 | 35 | | | 65 | | | | | | | |
| 3 | 35 | 5 | | 60 | | | | | | | |
| 4 | 35 | 2 | 5 | 58 | | | | | | | |
| 5 | 35 | 2 | 3 | 60 | | | | | | | |
| 6 | 35 | | | 62 | 3 | | | | | | |
| 7 | 35 | | | 60 | | 5 | | | | | |
| 8 | 35 | | 10 | 55 | | | | | | | |
| 9 | 35 | | | 60 | | | 5 | | | | |
| 10 | 35 | | | 60 | | | 5 | | | | |
| 11 | 35 | | | 61 | | | | 4 | | | |
| 12 | 35 | 15 | | 50 | | | | | | | |
| 13 | 35 | 9 | 7 | 49 | | | | | | | |
| 14 | 35 | | 0.7 | 57 | | | 5.1 | 1.1 | 1.1 | | |
| 15 | 35 | | 1.4 | 57 | | | 2.2 | 2.2 | 2.2 | | |
| 16 | 35 | | 2.5 | 57 | | | | 5.5 | | | |
| 17 | 35 | | | 57 | | | 8 | | | | |
| 18 | 35 | | 1.2 | 57 | | | 3.4 | | 3.4 | | |
| 19 | 35 | | 1.9 | 57 | | | 1.1 | 1.1 | 3.9 | | |
| 20 | 35 | | 1.2 | 57 | | | 3.4 | 3.4 | | | |
| 21 | 35 | | 2.5 | 57 | | | 5.5 | | | | |
| 22 | 35 | | 1.2 | 57 | | | | 3.4 | 3.4 | | |
| 23 | 35 | | 2.5 | 57 | | | | | 5.5 | | |
| 24 | 35 | | | 57 | | | | 8 | | | |
| 25 | 35 | | | 57 | | | | | 8 | | |
| 26 | 35 | | | 55 | 0.5 | | 2 | 7.5 | | | |
| 27 | 35 | | | 60 | 0.5 | | 2 | 2 | | | |
| 28 | 35 | | | 55 | 3 | | 2 | 5 | | | |
| 29 | 35 | | | 56 | 3 | | 3 | 3 | | | |
| 30 | 35 | | | 55 | 3 | | 5 | 2 | | | |
| 31 | 35 | | | 55.8 | 1.1 | | 5.4 | 2.7 | | | |
| 32 | 35 | | | 57.1 | 1.8 | | 2 | 4.1 | | | |
| 33 | 35 | | | 58 | 3 | | 2 | 2 | | | |
| 34 | 35 | | | 55 | 1.8 | | 4.1 | 4.1 | | | |
| 35 | 35 | | | 57.1 | 1.8 | | 4.1 | 2 | | | |
| 36 | 35 | | | 55 | 0.5 | | 7.5 | 2 | | | |
| 37 | 35 | | | 56.8 | 0.5 | | 3.9 | 3.8 | | | |
| 38 | 38 | | 15 | 15 | | | | 8 | | 19 | |
| 39 | 35 | 5.5 | 5 | 45 | | | | | | 4.5 | 5 |
| 40 | 30 | 16 | | 12 | | | | | | 12 | 30 |
| 41 | 28 | 7.5 | | 30 | | | | 1.7 | | 3.8 | 28 |
| 42 | 38 | | | 5 | | | | 5 | | 14 | 38 |
| 43 | 38 | 27 | 2 | 13 | | | | 6 | | | 14 |
| 44 | 35 | 9 | 7 | 49 | | | | | | | |

In Example 1, a 500 gram sample was prepared by charging a mogul mixer (#59821 from Baker Perkins of Saginaw, Mich.) having a 1 liter capacity, first with dry powder ingredients (i.e., clay) and then blending them for about 1–3 minutes. Next, the liquid ingredients (i.e., binder mixture) were added to the blend and the resulting material mixed for about 15–30 minutes. The fiber material was then added to the mixer and blended in for about 10–20 minutes.

The binder mixture was prepared by adding together 15 parts by weight acrylic emulsion (commercially available under the trade designation "NEOCRYL XA-2022" from ICI Resins US of Wilmington, Mass.), 15 parts by weight tackifier (commercially available under the trade designation "SNOWTACK 820A" from Eka Nobel, Inc., of Toronto, Canada), and 10 parts by weight plasticizer (commercially available under the trade designation "SANTICIZER 148" from Monsanto of St. Louis, Mo.). The clay was a kaolin clay (commercially available under the trade designation "DIXIE CLAY" from Dixie Clay of Bath, S.C.). The ceramic fiber was an aluminosilicate ceramic fiber (commercially available under the trade designation "CERAFIBER" from Thermal Ceramics of Augusta, Ga.). The glass frit was a silicate-based glass frit (commercially available under the trade designation "CEEPREE FIRE BARRIER FILLER, GRADE C-200" from ICI Americas of Wilmington, Del.).

In Examples 2–43, 50 gram samples were prepared by charging a 100 ml polypropylene beaker with the binder mixture as prepared in Example 1, glass frit ("CEEPREE FIRE BARRIER FILLER, GRADE C-200"), and any other ingredients listed in Table 1 and then stirring by hand until the mixture was homogeneous (about 15 minutes).

In Example 44, a binder mixture was prepared by adding together 15 parts by weight acrylic emulsion (commercially available under the trade designation "RHOPLEX HA-8" from Rohm and Haas Co. of Philadelphia, Pa.), 15 parts by weight tackifier ("SNOWTACK 820A"), and 10 parts by weight plasticizer (SANTICIZER 148").

The ceramic fiber was an aluminosilicate ceramic fiber ("CERAFIBER"). For Examples 39–43, the ceramic fibers were ball milled in a conventional 1 liter porcelain mill filled with 50 percent by volume of 1.25 cm (0.5 inch) diameter porcelain balls for about 15 minutes to obtain fibers about 50–100 micrometers in length. The fibers could be reduced in size by adding them to the mogul mixer and blending them with the other ingredients until the desired size of the fibers is achieved.

The boric and zinc acids were obtained from U.S. Borax of Los Angeles, Calif. The hydrated sodium silicate was obtained under the trade designation "BRIT SIL HS-240" from Philadelphia Quartz of Valley Forge, Pa. The sodium silicate cement for Example 9 was obtained under the trade designation "INSULTEMP CEMENT NO. 10" and for Examples 10, 14, 15, 17–21, and 26–37 was obtained under the trade designation "INSA-LUTE ADHESIVE CEMENT NO. P-1," both from Sauereisen Cements of Pittsburgh, Pa. The expanded vermiculite was obtained from W. R. Grace & Co. of Cambridge, Mass. The vermiculite was delaminated using the mogul mixer prepared by mixing for about 15–20 minutes with the other ingredients in the formulation.

For each formulation, the resulting viscous material was removed from the respective container and rolled with a glass jar or dowel into a sheet about 0.63 cm (0.25 inch) thick. Each sheet was dried in air at room temperature overnight. The edge protectant material was quite moldable even when it was dry.

Button Test

The button test was designed to examine how the edge protectant material behaved at elevated temperatures. After forming a sheet of edge protectant material, a 2.5 cm (1 inch) diameter disc was cut from the sheet after drying in air for about 30 minutes and then heated in a conventional laboratory, electrical resistance furnace. The disc was placed on the surface of a refractory brick after the furnace was up to temperature.

Some samples were indented at temperature with a metal crucible tong using light hand pressure. Samples which were relatively easy to indent were described as soft, whereas samples which were relatively difficult to indent were described as firm.

EXAMPLE 1

The disc of material, heated to about 900° C., was firm and appeared to be fused, but did not melt. After heating at 950° C. for 300 hours, the material exhibited no cracking or spalling and retained its shape.

EXAMPLES 2–5

The discs of material, heated to about 900° C. for about one hour, were firm. The heated discs were fused, without the appearance of having melted.

EXAMPLES 26–28

The discs of material, heated to about 900° C., were firm. The heated discs were fused, without the appearance of having melted, and did not exhibit cracking or spalling.

EXAMPLE 29

The disc of material, heated to about 900° C. for about 17.5 hours, melted due, it was thought, to the presence of the boric acid (a fluxing agent).

EXAMPLES 30–35

The discs of material, heated to about 900° C. for about 17.5 hours, were fused without the appearance of having melted, and exhibited no cracking or spalling.

EXAMPLE 36

The disc of material, heated to about 900° C. for about 36 hours, softened but did not melt to the degree observed for Example 29.

EXAMPLE 37

The disc of material, heated to about 900° C., was fused without the appearance of having melted, and exhibited no cracking or spalling.

EXAMPLES 40–44

These formulations were reinforced using aluminoborosilicate ceramic fiber yarn ("NEXTEL 312 CERAMIC FIBER"), as shown in FIG. 5. Each sample was heated for about 2 hours at about 950° C. Example 40 was firm at 950° C. Example 41 cracked severely and did not hold together very well. Example 42 was soft at 900° C. Examples 43 and 44 were firm at 900° C.

Erosion Test

The erosion test was designed to evaluate the ability of an intumescent mounting mat to resist edge erosion from hot, impinging air stream.

A sample of intumescent mat to be tested was cut into a 4.6 cm×4.9 cm rectangular shape and mounted so that an edge of the cut mat was flush with the leading edges of two independently electrically heated plates. The mat was compressed to a mount density of 0.60 g/cm³. The top plate was heated to 800° C. and the bottom plate was heated to 475° C. Air heated to about 615° C. was pulsed over the exposed mat edge at 60 times per minute through the circular 0.32 cm diameter round orifice of a nozzle positioned 1.588 cm (0.625 inch) from the edge of the mat. The gage pressure at the nozzle was about 0.19 MPa (27 psi). The test was terminated after 24 hours or when an erosion depth of 1.27 cm (0.5 inch) was reached.

The amount of erosion was determined by comparing the weight of a mounting mat before and after the test. The erosion rate was determined by dividing the weight lost during a test by the time of the test.

The mounting mat for Example 43 was prepared by pressing the Example 43 edge protectant material edgewise against an edge of an intumescent mat having a weight per unit area value of 3100 g/m² (commercially available under the trade designation "INTERAM MAT MOUNT, SERIES IV" from the 3M Company). Prior to the test, the mat was heated to about 800° C. on the top side and 475° C. on the bottom side for about 1 hour to burn the polymeric binder out of the edge protectant material.

The test was repeated for each of Comparative A (tested twice) and Comparative B. Comparative A was an intumescent mounting mat ("INTERAM MAT MOUNT, SERIES IV"). Comparative B was the same as the Comparative A mat except a 40 mesh stainless steel screen (square weave, 0.010 inch diameter wire, 316 stainless steel from Tetko Co. of Briarcliff Manor, N.Y.) was crimped over an edge of the mat, as described in U.S. Pat. No. 5,008,086 (Merry), the disclosure of which is incorporated by reference for its teaching of the use of screen material with intumescent mounting mats.

The results are shown in Table 2, below.

TABLE 2

| Example | Mount density, g/cm³ | Erosion rate, g/hour |
| --- | --- | --- |
| 43 | 0.60 | 0.000 |
| Comparative A | 0.60 | 0.900 |
| Comparative A | 0.60 | 0.780 |
| Comparative B | 0.60 | 0.008 |

The test data illustrate the ability of the edge protectant material to protect the exposed edge of an intumescent mounting mat from a hot, impinging gaseous stream.

Hot Shake Test

Hot shake test was used to further evaluate the suitability of the mounting mat according to the present invention as a mounting mat for a catalytic converter element. The hot shake test involved passing exhaust gas through a catalytic converter element mounted with a mounting mat in a metallic casing while simultaneously subjecting the catalytic converter assembly to mechanical vibration sufficient to provide an acceleration of up to 20 g's at a frequency of 100 Hz. The vibration was supplied by a conventional vibrator (commercially available from Unholtz-Dickie Corp. of Wallingford, Conn.). The heat source was a natural gas burner capable of supplying gas inlet temperature to the converter of about 800–900° C. The exhaust gas temperature was cycled to test the mat's ability to maintain its resiliency and corresponding holding force as the metal casing expanded and contracted over the temperature range. Each cycle included 10 minutes at the high temperature and 10 minutes with the natural gas shut off. Vibration was maintained throughout the thermal cycling. The duration of the test was 10 cycles.

A 12.7 cm diameter ceramic honeycomb monolith (commercially available under the trade designation "CELCOR" from Corning Inc. of Corning, N.Y.) was used for testing the edge protected mats.

The monolith was wrapped with an intumescent mat ("INTERAM MAT MOUNT, SERIES IV") to which a 0.63 cm (0.25 inch) wide strip of edge protectant material was applied. The results are described below.

EXAMPLE 1

This formulation was extruded around aluminoborosilicate ceramic fiber yarn (commercially available under the trade designation "NEXTEL 312" from the 3M Company of St. Paul, Minn.). The resulting edge protectant material was then applied to the edge of intumescent mat as shown in FIG. 5 and tested using the Hot Shake test for 10 cycles from 150° C. to 950° C. The tested formulation exhibited some cracking.

After cooling to room temperature, the edge protectant was somewhat brittle and cracked if flexed.

EXAMPLES 2–5

Each formulation was applied to an edge of sheet material as shown in FIG. 4 (i.e., a 0.63 cm wide strip of edge protectant material was affixed to one edge of intumescent sheet material by a 2.5 cm wide 16×16 mesh stainless steel screen (commercially available from Tetko Co. of Briarcliff Manor, N.Y.) and tested in hot Shake test for 10 cycles from 150° C. to 950° C. Tested Examples 2–5 exhibited little or no cracking. Examples 4 and 5, in particular, exhibited very little cracking due, it was thought, to the reinforcement effect by the fibers in the formulation.

EXAMPLES 6–10

Each formulation was applied to edges of sheet material as shown in FIG. 3 and affixed with pressure sensitive tape (3M Brand #375 Pressure Sensitive Adhesive Tape from the 3M Company). Examples 6 and 7 exhibited improved adhesion to the ceramic monolith over that of Examples 8–10 due, it was thought, to the presence of boric acid and sodium silicate acting as fluxing agents and increasing the softness of the formulation at high temperatures. All formulations exhibited good appearance (i.e., little cracking) after the Hot Shake test.

EXAMPLE 11

This formulation was formed into a strip and adhered to the edge of the intumescent mat and then covered with a ceramic paper 2.5 cm wide (commercially available from Carborundum Co. of Niagara Falls, N.Y., under the trade designation "FIBERFRAX" as shown in FIG. 3). The edge protectant material was sufficiently sticky and moldable so that it could be pressed next to the paper and next to the mat without additional adhesive. The Hot Shake test was performed. This sample exhibited very little cracking, good flexibility, and good performance in the test.

EXAMPLE 12

This formulation was reinforced with fiberglass cloth (commercially available under the trade designation "S-2 GLASS" from Owens Corning Fiberglas Corp. of Granville, Ohio.), as shown in FIG. 3. The mat was prepared as described in Example 11, except the ceramic paper was replaced with the fiberglass cloth. The Hot Shake test was performed. The fiberglass cloth appeared to act as reinforcement and minimized cracking.

EXAMPLE 13

This formulation was reinforced with an aluminoborosilicate ceramic cloth (commercially available under the trade designation "NEXTEL 312 CERAMIC CLOTH" from the 3M Company). More specifically, the mat was prepared as described in Example 11 except the ceramic paper was replaced by the aluminoborosilicate ceramic cloth. The aluminoborosilicate ceramic cloth was affixed to the edge of a mat by a pressure sensitive adhesive backed film (3M Brand #375 Pressure Sensitive Adhesive Tape). The mat was tested using the Hot Shake test. The ceramic cloth was believed to act as a reinforcement of the edge protectant material.

Cracks were present in the edge protectant material after the Hot Shake test, but the edge protectant material did not separate from the edge of the mat. The cracks appeared to heal by fusion of the edge protectant material. The Example 13 formulation conformed well to the mat edge during the Hot Shake test.

EXAMPLES 14–25

These formulations were subjected to 10 thermal cycles i n the Hot Shake t est. For Examples 14–17, there was an undesirable amount of shrinkage and cracking of the edge protectant material and less than desired adherence to the intumescent mat and underlying ceramic monolith. Although the formulations of Examples 14–17 are considered to be useful as an edge protectant, such formulations are not preferreed.

For Examples 15, 16, and 18–25, there was some cracking of the edge protectant material and adherence to the monolith.

EXAMPLE 38

Example 38 was t ested in the same manner as described for Example 1. There was some cracking of the edge protectant material. Further, when the converter was disassembled, the edge protectant material was observed to be loose (i.e., not attached to the edge of the mat).

EXAMPLE 39

Example 39 was tested in the same manner as described for Example 1. It appeared to conform very well to the mat edge during the tests and had a very good appearance with little or no cracking.

Various modifications and alte rations of this invention will become apparent to those skilled in the art without departing from the scope and spirit of this invention, and it should be understood that this invention is not to be unduly limited to the illustrative embodiments set forth herein.

What is claimed is:

1. A catalytic converter comprising:
   (a) a metallic casing having a gas inlet and a gas outlet;
   (b) a catalytic converter element disposed within said metallic casing, said catalytic converter element having a gas inlet end and a gas outlet end;
   (c) intumescent mounting mat having first and second opposed major surfaces, a leading edge, and a trailing edge mat being disposed between said catalytic converter element and said metallic casing for positioning the catalytic converter element within said metallic casing and for absorbing mechanical vibration; and
   (d) an edge protectant material positioned between said metallic casing and said catalytic converter element, and positioned with respect to at least one of the leading or the trailing edges of said mounting mat such that erosion of said at least one of the leading or the trailing edges is reduced when exposed to hot, impinging gases when said catalytic converter is in use, said edge protectant material comprising binder material in the range from about 5 to about 85 percent by weight and dispersed therein glass particles in the range from about 95 to about 15 percent by weight, based on the total weight of said binder material and said glass particles, and said glass particles being capable of forming and being arranged to form a cohesive mass during said use of said catalytic converter, the cohesive mass being capable of forming at a temperature not greater than 950° C., wherein said glass particles are made of a glass having a softening point of at least about 350° C., and wherein the combined weight of said binder material and said glass particles is at least 20 percent by weight of the total weight of said edge protectant material.

2. The catalytic converter according to claim 1 wherein said edge protectant material comprises binder material in the range from about 15 to about 85 percent by weight and glass particles in the range from about 85 to about 15 percent by weight.

3. The catalytic converter according to claim 1 wherein said intumescent mounting mat comprises vermiculite material and organic binder.

4. The catalytic converter according to claim 3 wherein said intumescent mounting mat further comprises a filler selected from the group consisting of ceramic filler other than said glass particles, fluxes, extenders, and combinations thereof.

5. The catalytic converter according to claim 4 wherein said ceramic filler other than said glass particles is ceramic fiber.

6. The catalytic converter according to claim 1 wherein said binder material includes at least one of a plasticizer, a tackifier, or both.

7. The catalytic converter according to claim 1 wherein said mounting mat further comprises a strip of metallic fabric positioned over at least a portion of said edge protectant material.

8. The catalytic converter according to claim 1 wherein the cohesive mass is capable of forming at a temperature not greater than 900° C.

9. A diesel particulate filter comprising
   (a) a metallic casing having a gas inlet and a gas outlet;
   (b) a diesel particulate filter element disposed within said metallic casing, said diesel particulate filter element having a gas inlet end and a gas outlet end;
   (c) an intumescent mounting mat having first and second opposed major surfaces, a leading edge, and a trailing edge, said mounting mat being disposed between said diesel particulate filter element and said metallic casing for positioning said diesel particulate filter element within said metallic casing and for absorbing mechanical vibration; and
   (d) an edge protectant material positioned between said metallic casing and said diesel particulate filter element, and positioned with respect to at least one of the leading or the trailing edges of said mounting mat such that erosion of said at least one of the leading or the trailing edges is reduced when exposed to hot, impinging gases when said diesel particulate filter converter is in use, said edge protectant material comprising binder material in the range from about 5 to about 85 percent by weight and dispersed therein glass particles in the range from about 95 to about 15 percent by weight, based on the total weight of said binder material and said glass particles, and said glass particles being capable of forming and being arranged to form a cohesive mass during said use of said diesel particulate filter, the cohesive mass being capable of forming at a temperature not greater than 950° C., wherein said glass particles are made of a glass having a softening point of at least about 350° C., and wherein the combined weight of said binder material and said glass particles is at least 20 percent by weight of the total weight of said edge protectant material.

10. The diesel particulate filter according to claim 9 wherein said edge protectant material comprises binder material in the range from about 15 to about 85 percent by weight and glass particles in the range from about 85 to about 15 percent by weight.

11. The diesel particulate filter according to claim 7 wherein said intumescent mounting mat comprises vermiculite material and organic binder.

12. The diesel particulate filter according to claim 11 wherein said intumescent mounting mat further comprises a filler selected form the group consisting of ceramic filler other than said glass particles, fluxes, extenders, and combinations thereof.

13. The diesel particulate filter according to claim 12 wherein said ceramic filler other than said glass particles is ceramic fiber.

14. The diesel particulate filter according to claim 9 wherein said binder material includes at least one of a plasticizer, a tackifier, or both.

15. The diesel particulate filter according to claim 9 wherein said mounting mat further comprises a strip of metallic fabric positioned over at least a portion of said edge protectant material.

16. The diesel particulate filter according to claim 9 wherein the cohesive mass is capable of forming at a temperature not greater than 900° C.

17. A catalytic converter comprising a metallic casing having a gas inlet and a gas outlet, a catalytic converter element having a gas inlet end and a gas outlet end and being disposed within said metallic casing, and a mounting mat disposed between said catalytic converter element and said metallic casing for positioning said catalytic converter element within said metallic casing and for absorbing mechanical vibration, said mounting mat comprising:

(a) an intumescent sheet material having first and second opposed major surfaces, a leading edge, and a trailing edge; and (b) an edge protectant material covering at least one of the leading or the trailing edges to reduce erosion of said at least one of the leading or the trailing edges when exposed to hot, impinging gases when said catalytic converter is in use, said edge protectant material comprising binder material in the range from about 5 to about 85 percent by weight and dispersed therein glass particles in the range from about 95 to about 15 percent by weight, based on the total weight of said binder material and said glass particles, and said glass particles being capable of forming and being arranged to form a cohesive mass during said use of said catalytic converter, the cohesive mass being capable of forming at a temperature not greater than 950° C., wherein said glass particles are made of a glass having a softening point of at least about 350° C., and wherein the combined weight of said binder material and said glass particles is at least 20 percent by weight of said total weight of said edge protectant material.

18. The catalytic converter according to claim 17 wherein said binder material includes at least one of a plasticizer, a tackifier, or both.

19. The catalytic converter according to claim 17 wherein the cohesive mass is capable of forming at a temperature not greater than 900° C.

20. A diesel particulate filter comprising a metallic casing having a gas inlet and a gas outlet, a diesel particulate filter element having a gas inlet end and a gas outlet end and being disposed within said metallic casing, and a mounting mat disposed between said diesel particulate element and said metallic casing for positioning said diesel particulate element within said metallic casing and for absorbing mechanical vibration, said mounting mat comprising:

(a) an intumescent sheet material having first and second opposed major surfaces, a leading edge, and a trailing edge; and (b) an edge protectant material covering at least one of the leading or the trailing edges to reduce erosion of said at least one of the leading or the trailing edges when exposed to hot, impinging gases when said diesel particulate filter is in use, said edge protectant material comprising binder material in the range from about 5 to about 85 percent by weight and dispersed therein glass particles in the range from about 95 to about 15 percent by weight, based on the total weight of said binder material and said glass particles, and said glass particles being capable of forming and being arranged to form a cohesive mass during said use of said diesel particulate filter, the cohesive mass being capable of forming at a temperature not greater than 950° C., wherein said glass particles are made of a glass having a softening point of at least about 350° C., and wherein the combined weight of said binder material and said glass particles is at least 20 percent by weight of said total weight of said edge protectant material.

21. The diesel particulate filter according to claim 20 wherein said binder material includes at least one of a plasticizer, a tackifier, or both.

22. The diesel particulate filter according to claim 20 wherein the cohesive mass is capable of forming at a temperature not greater than 900° C.

23. A catalytic converter comprising:

(a) a metallic casing having a gas inlet and a gas outlet;

(b) a catalytic converter element disposed within said metallic casing, said catalytic converter element having a gas inlet end and a gas outlet end;

(c) an intumescent mounting mat having first and second opposed major surfaces, a leading edge, and a trailing edge, said intumescent mounting mat comprising vermiculite material and organic binder, said mounting mat being disposed between said catalytic converter element and said metallic casing for positioning the catalytic converter element within said metallic casing and for absorbing mechanical vibration; and (d) an edge protectant material positioned between said metallic casing and said catalytic converter element, and positioned with respect to at least one of the leading or the trailing edges of said mounting mat such that erosion of said at least one of the leading or the trailing edges is reduced when exposed to hot, impinging gases when said catalytic converter is in use, said edge protectant material comprising binder material in the range from about 15 to about 85 percent by weight and dispersed therein glass particles in the range from about 85 to about 15 percent by weight, based on the total weight of said binder material and said glass particles, and said glass particles being capable of forming and being arranged to form a cohesive mass during said use of said catalytic converter, the cohesive mass being capable of forming at a temperature not greater than 950° C., wherein said glass particles are made of a glass having a softening point of at least about 350° C., wherein said binder material includes at least one of a plasticizer, a tackifier, or both, and wherein the combined weight of said binder material and said glass particles is at least 20 percent by weight of the total weight of said edge protectant material.

24. The catalytic converter according to claim 23 wherein the cohesive mass is capable of forming at a temperature not greater than 900° C.

25. A catalytic converter comprising a metallic casing having a gas inlet and a gas outlet, a catalytic converter element having a gas inlet end and a gas outlet end and being disposed within said metallic casing, and a mounting mat disposed between said catalytic converter element and said metallic casing for positioning said catalytic converter element within said metallic casing and for absorbing mechanical vibration, said mounting mat comprising:

(a) an intumescent sheet material having first and second opposed major surfaces, a leading edge, and a trailing edge, said intumescent sheet material comprising vermiculite material and organic binder; and (b) an edge protectant material covering at least one of the leading or the trailing edges to reduce erosion of said at least one of the leading or the trailing edges when exposed to hot, impinging gases when said catalytic converter is in use, said edge protectant material comprising binder material in the range from about 15 to about 85 percent by weight and dispersed therein glass particles in the range from about 85 to about 15 percent by weight, based on the total weight of said binder material and said glass particles, and said glass particles being capable of forming and being arranged to form a cohesive mass during said use of said catalytic converter, the cohesive mass being capable of forming at a temperature not greater than 950° C., wherein said glass particles are made of a glass having a softening point of at least about 350° C., wherein said binder material includes at least one of a plasticizer, a tackifier, or both, and wherein the combined weight of said binder material and said glass particles is at least 20 percent by weight of said total weight of said edge protectant material.

26. The catalytic converter according to claim 25 wherein the cohesive mass is capable of forming at a temperature not greater than 900° C.

* * * * *

UNITED STATES PATENT AND TRADEMARK OFFICE
CERTIFICATE OF CORRECTION

PATENT NO. : 6,245,301 B1
DATED : June 12, 2001
INVENTOR(S) : Paul D. Stroom, Gary F. Howorth and Michael T. Schweitzer It is certified that error appears in the above-identified patent and that said Letters Patent is hereby corrected as shown below:

Column 15,
Lines 13 and 14, "i n" should read -- in --;
Line 14, "t est" should read -- test --;
Line 26, "t ested" should read -- tested --;
Line 37, "alte rations" should read -- alterations --;
Line 51, "edge mat" should read -- edge, said mounting mat --;

Column 17,
Line 6, "claim 7" should read -- claim 9 --.

Signed and Sealed this

Sixteenth Day of July, 2002

Attest:

JAMES E. ROGAN
Attesting Officer       Director of the United States Patent and Trademark Office